(12) United States Patent
Vestweber

(10) Patent No.: US 11,503,816 B2
(45) Date of Patent: Nov. 22, 2022

(54) HANDLE FOR A FISH SPEAR AND FISH SPEAR

(71) Applicant: Boris Vestweber, Pembroke (BM)

(72) Inventor: Boris Vestweber, Pembroke (BM)

( * ) Notice: Subject to any disclaimer, the term of this patent is extended or adjusted under 35 U.S.C. 154(b) by 57 days.

(21) Appl. No.: 17/064,849

(22) Filed: Oct. 7, 2020

(65) Prior Publication Data

US 2022/0104470 A1    Apr. 7, 2022

(51) Int. Cl.
*A01K 81/04*    (2006.01)

(52) U.S. Cl.
CPC .................................... *A01K 81/04* (2013.01)

(58) Field of Classification Search
CPC ......... A01K 81/04; A01K 87/08; A01K 81/00
See application file for complete search history.

(56) References Cited

U.S. PATENT DOCUMENTS

| | | | |
|---|---|---|---|
| 4,014,125 A | 3/1977 | Baldi et al. | |
| 5,243,778 A * | 9/1993 | Henley | A01K 81/04 43/6 |
| 6,550,178 B1 * | 4/2003 | Rogers | A01K 81/04 43/6 |
| 9,220,246 B1 * | 12/2015 | Roman | A01K 81/04 |
| 9,719,752 B1 * | 8/2017 | Nibecker, Jr. | A01K 81/00 |
| 10,215,523 B1 * | 2/2019 | Hamilton | A01K 81/04 |
| 2001/0032409 A1 | 10/2001 | Nicolai | |
| 2012/0085330 A1 * | 4/2012 | Hickerson | A01K 81/04 124/22 |
| 2016/0106080 A1 | 4/2016 | Chaput | |

FOREIGN PATENT DOCUMENTS

| | | | | |
|---|---|---|---|---|
| ES | 2365597 T3 * | 10/2011 | | F41B 7/04 |
| KR | 200483789 Y1 * | 6/2017 | | A01K 81/04 |

OTHER PUBLICATIONS

OGG Craft's Gun Locker, Sep. 2008, https://oggcraft.jp/eng/eng_p605.html (Year: 2008).*

* cited by examiner

*Primary Examiner* — Timothy D Collins
*Assistant Examiner* — Maria E Graber
(74) *Attorney, Agent, or Firm* — Andrus Intellectual Property Law, LLP

(57) ABSTRACT

Shown and described is a handle for a fish spear, the fish spear comprising a one-piece or multi-piece spear rod and an elastic band as a tensioning element, the spear rod having a spear tip at one end and the elastic band being attachable to the other end of the spear rod to tension the elastic band along the spear rod with a user's hand, wherein the handle is adapted to releasably secure the tensioned elastic band and includes a trigger mechanism for manually releasing the elastic band from the handle.

7 Claims, 5 Drawing Sheets

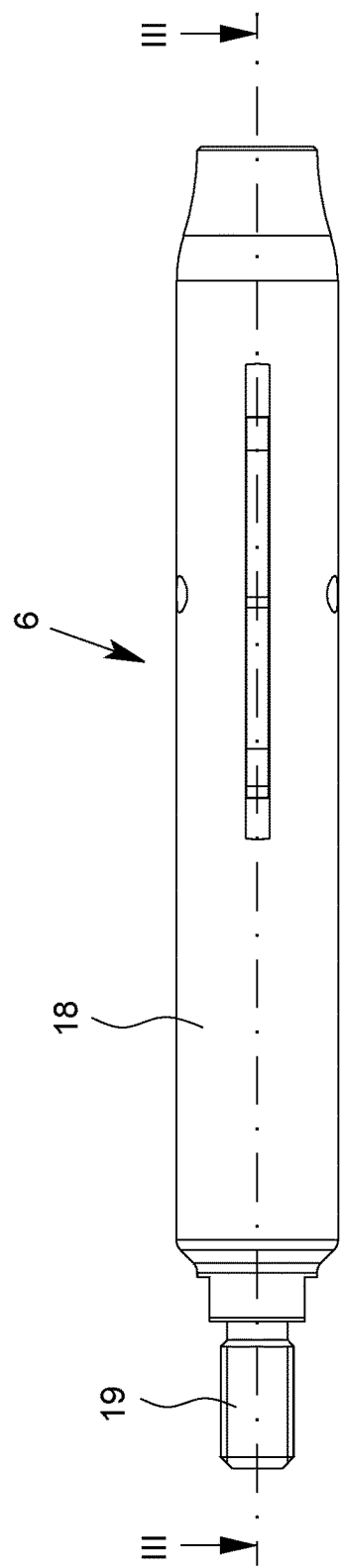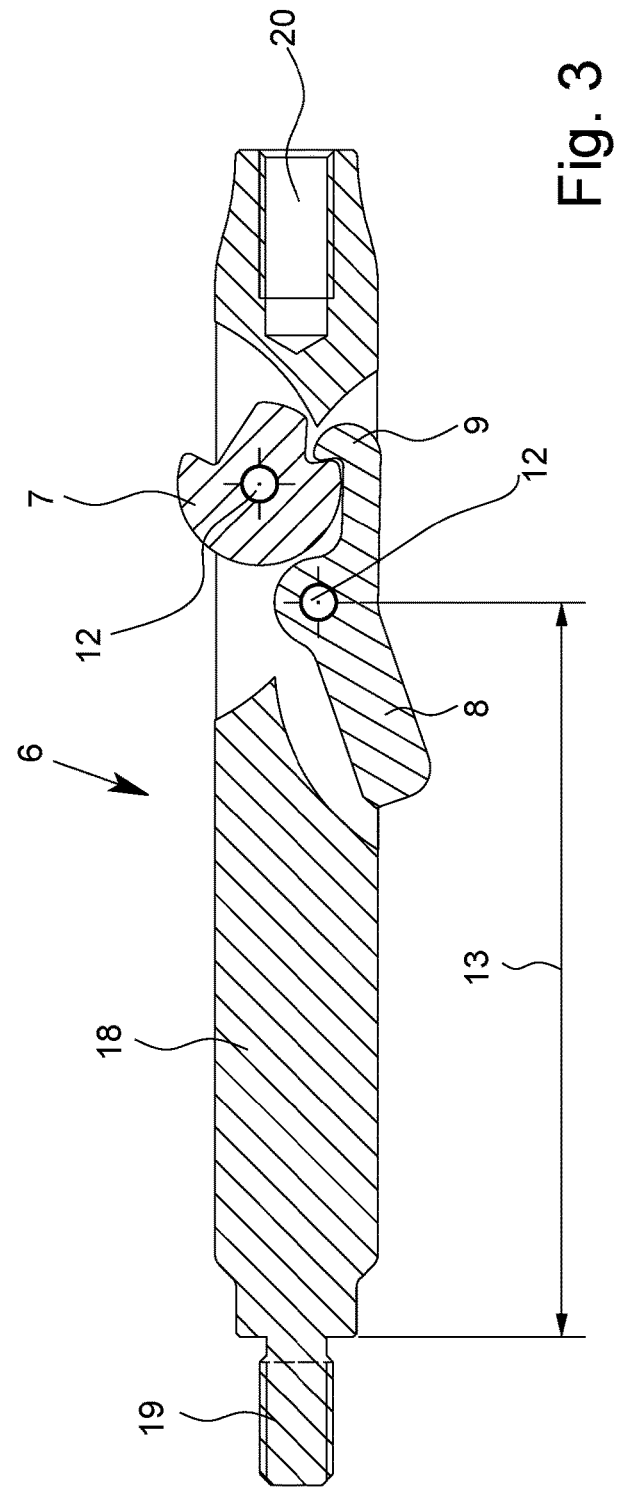

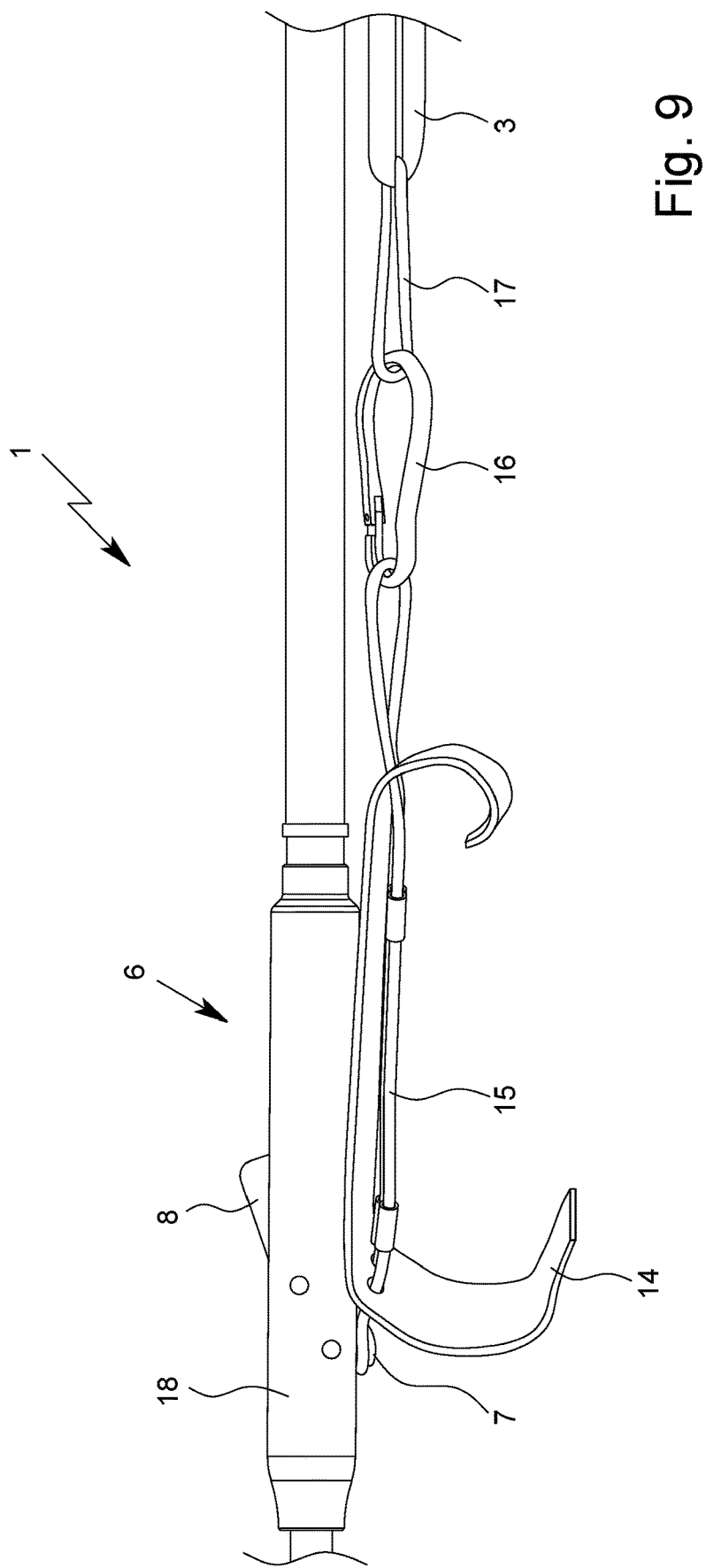

HANDLE FOR A FISH SPEAR AND FISH SPEAR

FIELD

The present invention relates to a handle for a fish spear, the fish spear comprising a one- or multi-part spear rod and an elastic band as a tensioning element. Furthermore, the present invention relates to a fish spear with a handle, with a one- or multi-part spear rod and with an elastic band as tensioning element.

BACKGROUND

The present invention relates to fish spears, also known as "polespears" or "Hawaiian spears", which are used as portable hunting tools for underwater fishing, especially for snorkeling or diving. The function of such fish spears is based on the attachment of an elastic band as a tensioning element to one end of a spear rod of the fish spear, wherein this band typically forms a loop. To handle or activate the fish spear, a user's hand grips the elastic band and then stretches it along the spear rod to a grip section or handle of the spear rod, wherein the band is then held in a taut or tensioned state.

A fish spear as mentioned above is known from US 2001/0032409 A1. This fish spear has a spear-rod and a handle arranged on the spear-rod, which is equipped with a hook to hold a loop-shaped elastic band. To release the fish spear, the user must reach through the loop end of the tensioned band with his hand and stretch it further to be able to pull it off the hook. After pulling off the elastic band, the user grasps the spear rod with the tensioned band in his hand at a point behind the hook. To activate or fire the spear, the user then releases the spear rod, but still holds the elastic band so that the fish spear, as a result of the pulling force of the band stored in the elastic band, rushes forward to catch or impale a previously targeted marine animal.

The disadvantage of this fish spear known from the prior art is that the user has to actively release the tensioned band from the hook to release the fish spear. To do this, the already tensioned band has to be stretched or tightened even further to be able to pull it over the hook. In practice, this is a laborious and cumbersome procedure, and the result is uncomfortable

SUMMARY

Consequently, it is an object of the present invention to provide a handle for a fish spear as well as a fish spear of the aforementioned type, which allow a comfortable and effortless handling, especially a comfortable release of the tensioned elastic band from the handle.

The aforementioned object is solved by a handle for a fish spear with the features of claim 1 and by a fish spear with the features of claim 10. Advantageous embodiments of the handle are subject of the subclaims.

In accordance with the invention, the handle is designed for releasably securing the tensioned elastic band or for holding the tensioned elastic band and comprises a trigger mechanism for manually releasing the elastic band from the handle with the hand of a user.

The use of the trigger mechanism enables the manually operated automatic release of the elastic band from the handle. The elastic band is attached or held to the handle in a tensioned state before the trigger mechanism is activated. As an improvement compared to the previously discussed state of the art, the elastic band does not have to be actively released from the handle by further stretching, but is automatically released from the handle by a force-saving actuation of the trigger mechanism.

Before the trigger mechanism is activated, the user's hand can reach through a looped end of the elastic band held on the handle and the user can then grasp the handle and/or spear rod with his hand. Immediately prior to an intended firing of the spear, the user can then manually actuate or release the trigger mechanism, whereupon the tensioned elastic band is released from the grip and is no longer held by the handle but by the user's hand. As a result, the elastic band must be actively held in a tensioned state by the user's hand just before the fish spear is fired. This considerably reduces the amount of force required to handle the fish spear.

In accordance with a preferred embodiment of the present invention, the trigger mechanism comprises a trigger hook for releasably hooking the tensioned band to the handle and a trigger latch for releasing the trigger hook, wherein manual actuation of the trigger latch results in movement of the trigger hook to a release position and automatic release of the band from the trigger hook. The user's adjustment force required to manually actuate the trigger latch can be directly transferred to the trigger hook and result in the movement of the trigger hook to a release position. However, it is also possible that the trigger hook is spring-loaded and manual actuation of the trigger latch results in the release of a spring acting on the trigger hook. The spring force of the spring then moves the trigger hook into the release position. The user's actuating force must then be sufficient to release the spring by moving the trigger latch.

By means of a mechanical coupling between the trigger hook and the trigger latch, the tensioned band can be released from the trigger hook by actuating the trigger latch with minimal force and movement. In particular, it is possible for the user's hand to enclose the handle and for the trigger latch to be actuated by the index finger, for example.

Preferably, it is intended that the tensile force of the tensioned elastic band is transferable to the user's hand when the band is released from the trigger hook, whereby the spear rod is held by hand in a tensioned state of the band before the spear is fired. However, before the band is detached from the handle by actuating the trigger mechanism, the band is held in a tensioned state on the handle, preferably on the trigger hook, without any action by the user. To fire the spear, the user releases the spear rod, but still holds the free end of the tensioned band, which is preferably designed as a loop end, so that the fish spear, with the spear tip first, shoots forward due to the band tension of the tensioned band. For reloading or shooting the elastic band is then tensioned again along the spear tip and the free end of the tensioned band is hooked into the handle, preferably into the trigger hook.

According to a first preferred embodiment of the present invention, the trigger hook is designed in a holding position for holding the tensioned band, whereby the transmission of a manual actuating force to the trigger latch results in the movement of the trigger hook from the holding position to the release position. If no force is transmitted to the trigger latch by a user, the trigger hook rests in the holding position.

According to another preferred embodiment of the present invention, the trigger hook can also be held in the holding position by transmitting a manual actuating force to the trigger latch. With this design, the user must actively hold the trigger hook in the holding position; if the force is not applied, the trigger hook automatically moves into the release position. For this purpose, the trigger hook can be spring-loaded, whereby the trigger hook is forced into the release position by spring force and whereby the user's holding force is transmitted via the trigger latch and acts against the spring force. In particular, the band tension of the tensioned band acts on the trigger hook and automatically pushes the trigger hook into the release position if no manual holding force is transmitted to the trigger hook via the trigger latch.

This embodiment thus provides in particular for the trigger latch to be actively pressed by the user before releasing the band or detaching the band from the trigger hook in order to hold the trigger hook in the holding position in which the tensioned band is securely held on the trigger hook. The trigger hook is then moved into the release position by releasing the trigger latch, and the trigger hook is automatically moved into the release position by the band tension of the tensioned band.

The trigger hook and/or the trigger latch can preferably be arranged swiveling or pivoting within a receiving space of the handle. In particular, the trigger hook can be swiveled between the holding position and the release position, preferably in such a way that the trigger hook can be swiveled into the handle from a holding position protruding from the handle until it reaches an internal release position in order to reliably implement a release of the previously hooked elastic band. In the release position, the trigger hook protrudes from the handle at most slightly at the periphery to facilitate the pulling off or slipping of the elastic band. The trigger latch is also mounted on the handle in a swiveling manner, whereby the trigger latch can either be swiveled into the handle or out of the handle to release the trigger hook.

Preferably the handle has an elongated and/or cylindrical base body. This allows easy and safe handling of the handle, in particular reliable gripping of the handle by the user's hand.

Furthermore, according to a particularly preferred design, the handle is provided with a detachable connection to a fish spear or spear pole, especially detachable with two fish spear parts, which can be screwed and/or plugged to both handle ends via a screw connection. The base body of the handle can have a screw thread at each end of the handle to enable the screwing of segments or parts of the fish spear.

A safety element is assigned to the trigger mechanism in order to block the manual operation of the trigger mechanism and the manual release of the elastic band from the handle if required. This enables a corresponding safety function to prevent accidental triggering of the trigger mechanism or release of the elastic and tensioned band from the trigger hook, thus ensuring that the trigger mechanism is only activated intentionally.

A further object of the present invention is also to provide a fish spear having a handle, a one-piece or multi-piece spear rod and an elastic band as a tensioning element, the spear rod having a spear tip at one end and the band being attachable to the other end of the spear rod in order to tension the band along the spear rod with the hand of a user, the handle being adapted for releasably attaching the tensioned band and having a trigger mechanism for manually releasing the band from the handle with the hand of a user. In this respect, the present invention also provides a fish spear with the handle according to the invention in the sense of the previous embodiments, whereby the aforementioned advantages and special features can be realized accordingly.

Further advantages, features, properties and aspects of the present invention result from the claims and the following description of preferred embodiments based on the drawing. The described and/or shown embodiments and the associated advantages, features, properties and aspects of the present invention can be combined with each other as required, even if this is not described and/or shown in detail.

DETAILED DESCRIPTION

Figure 1:
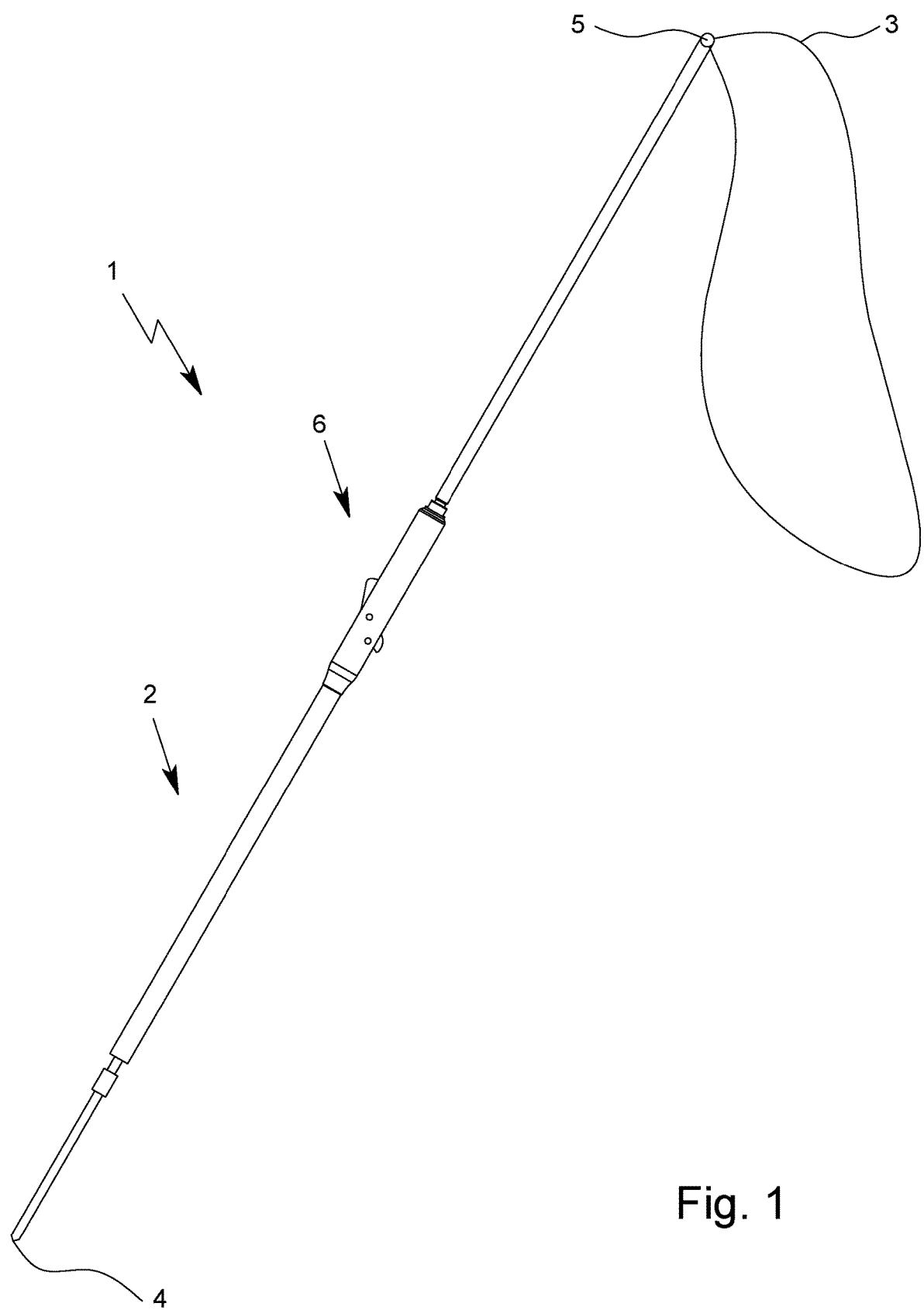
FIG. 1 a perspective view of a fish spear according to the invention, with a handle according to the present invention, a multi-part spear rod and an elastic band as a tensioning element, FIG. 2 a schematic side view of the handle of the invention according to a first embodiment, FIG. 3 a schematic sectional view of the inventive handle shown in FIG. 2, FIG. 4 a perspective view of the handle according to the invention with a trigger hook in a holding position for holding the elastic band, FIG. 5 a perspective view of the handle according to the invention with the trigger hook in a release position and the band detached from it, FIG. 6 a schematic sectional view of an invented handle according to a further or second embodiment of the present invention, FIG. 7 a perspective view of the inventive handle shown in FIG. 6 with the trigger hook in the holding position, FIG. 8 a perspective view of the handle according to the second embodiment with the trigger hook in the release position and FIG. 9 a perspective view of the handle according to a further or third embodiment.

FIG. 1 shows a schematic view of a fish spear 1 in perspective.

The fish spear 1 has a multi-part spear rod 2 and an elastic band 3 as tensioning element.

The fish spear 1 is limited on one side by a spear tip 4 at one end and opposite by another end 5, the elastic band 3 being attached to the end 5 opposite to the spear tip 4, thereby forming an elastic loop at the end facing the spear tip 4.

As shown in FIG. 1, the spear rod 2 has several rod segments, one segment has or forms the spear tip 4 and another segment forms the other end 5. In between, the handle 6 is inserted as a separate component or segment, especially screwed in, so that the spear rod 2 can be assembled in segments or modules, especially screwed together. At least one of the segments can be made of a metal material, preferably aluminum, and/or a plastic material, preferably a fiber-reinforced plastic material, in particular a carbon material.

To activate the fish spear 1, a (not shown) user stretches the elastic band 3 along the spear rod 2 up to the handle 6. The handle 6 is designed for releasable fastening of the stretched elastic band 3.

According to the invention, the handle 6 has a trigger mechanism for manually releasing the elastic band 3 from the handle 6 with the user's hand.

As illustrated in particular by the sectional view shown in FIG. 3, the trigger mechanism has a trigger hook 7 for releasably hooking the tensioned band 3, preferably a loop end of the tensioned band 3. In addition, the trigger mechanism is characterized by a trigger latch 8 that interacts with the trigger hook 7. The trigger latch 8 can be pressed with a finger or the user's hand, thus allowing the trigger hook 7 to be moved to a release position. FIG. 3 shows the trigger hook 7 in a holding position in which the elastic band 3 can be held in a tensioned state by a projection on the trigger hook 7 that protrudes beyond the circumference of the handle 6. A pivoting movement of the trigger latch 8 by actuating an actuation lever of the trigger latch 8 projecting beyond the circumference of the handle 6 results in the release of the trigger hook 7 which then, due to the band tension of the band 3 held on the hook 7, also performs a pivoting movement to a release position, thereby releasing the elastic band 3.

In the embodiment shown in FIG. 3, the trigger latch 8 locks the trigger hook 7 in the holding position to hold the elastic band 3 in the tensioned state. For this purpose, the trigger latch 8 has a locking projection 9 at the end of a locking lever that engages the trigger hook 7 at its circumference and thus blocks the movement of the trigger hook 7 in the holding position.

If the elastic band 3 is to be detached from the trigger hook 7, the user actuates the trigger latch 8, which in the embodiment shown is done by swiveling the actuating lever of the trigger latch 8 into the handle 6. The trigger latch 8 is designed as a two-sided lever with the actuating lever and the locking lever, whereby the locking projection 9 is formed at the locking lever. When the actuating lever is swiveled in, the locking lever is swiveled out, thus releasing the engagement of the locking projection 9 on the trigger hook 7, so that the trigger hook 7 moves from the holding position to the release position as a result of the band tension acting through the elastic band 3. In the embodiment shown, the trigger hook 7 swivels from the holding position into the release position in the handle 6, causing the elastic band 3 held on the hook 7 to be detached from the trigger hook 7.

Figure 4:
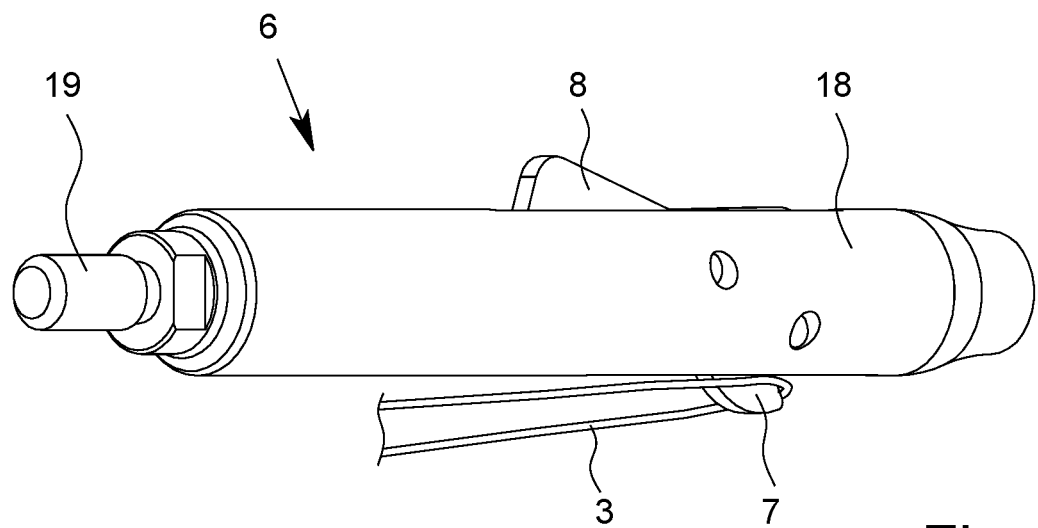
Figure 5:
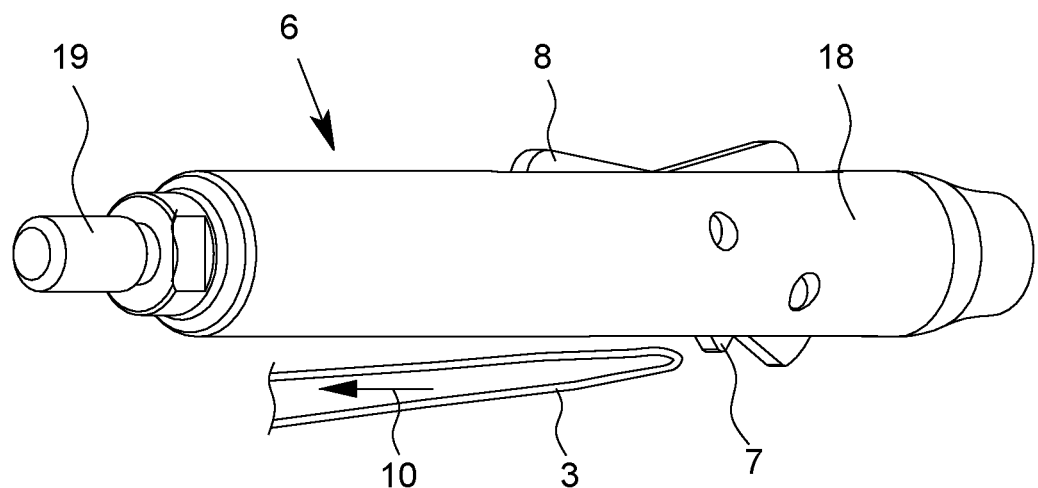

This fact is illustrated in FIGS. 4 and 5, where FIG. 4 shows the engagement of the trigger hook 7 on the elastic band 3 in a holding position and in a tensioned state of the elastic band 3, whereas FIG. 5 shows the trigger hook 7 in its release position, in which the elastic band 3 is released and the elastic band 3 is pulled in the direction shown by the arrow 10 or in the direction of the end 5 due to the stored band energy. It can be seen that the trigger hook 7 in FIG. 5 is swiveled into the handle 6 as shown in FIG. 4. The same applies to the trigger latch 8.

It is not shown that the elastic band 3 is held in a tensioned state at the spear rod 2 or at the handle 6 after being detached from the trigger hook 7 by the user's hand. To do this, the user reaches with his thumb through the free end of the band 3, which is designed as a sling or loop, and then encloses the handle 6 or a segment of the spear rod 2 located near the handle 6. To fire the fish spear 1, the user then releases the spear rod 2, but continues to hold the band 3 so that the spear rod 2 slides through the user's hand with the spear tip 4 first and is driven to the target due to the band energy stored in the elastic band 3.

Figure 6:
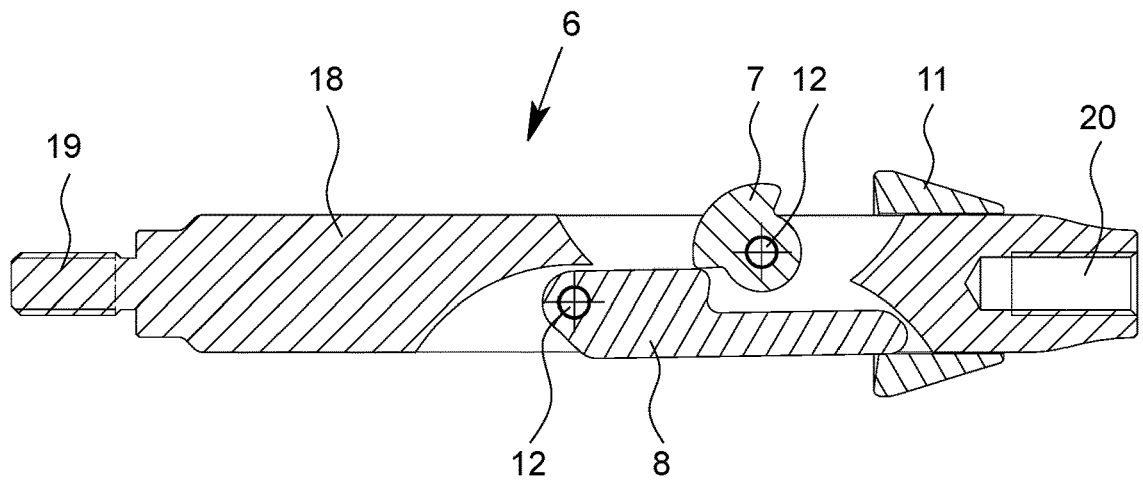
Figure 7:
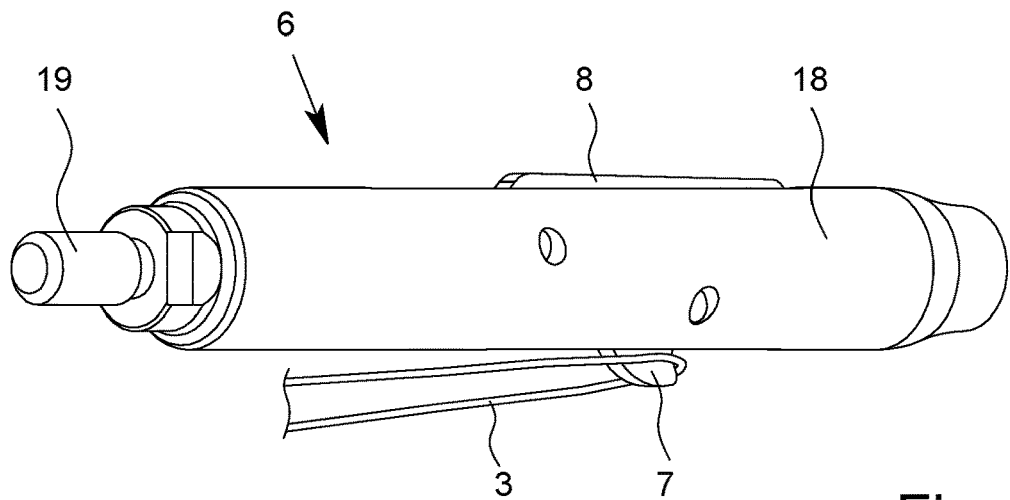
Figure 8:
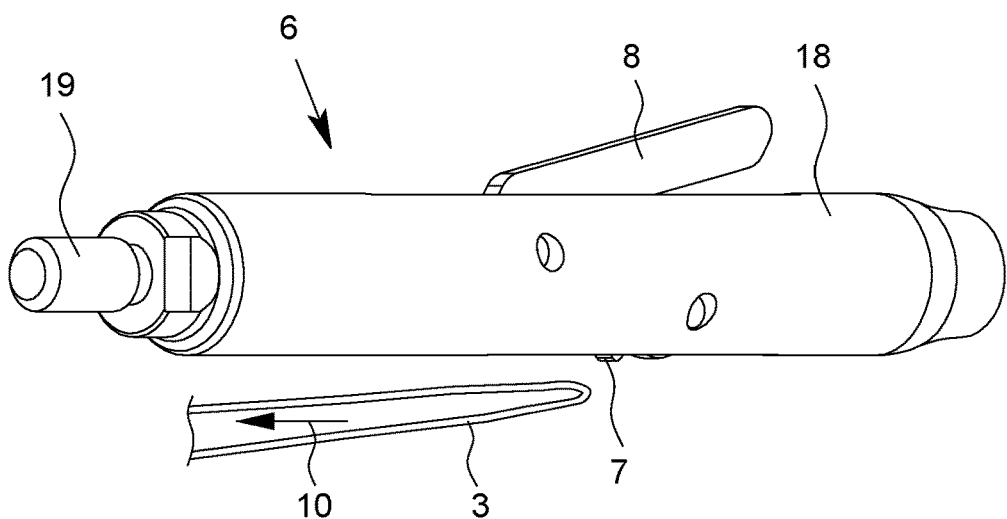

In the following, FIGS. 6 to 8 are used to describe a further embodiment of the present invention. It is understood that the features and aspects previously described with respect to the first embodiment can also be applied to the following embodiment without the need for repeated mention.

In contrast to the previously described embodiment, in the embodiment described in the FIGS. 6 to 8, the trigger hook 7 can be moved into the release position by releasing the trigger latch 8, whereby the movement of the trigger hook 7 into the release position causes the elastic band 3 to be detached from the trigger hook 7. The trigger hook 7 is released by swinging out the trigger latch 8. To swivel out the trigger latch 8, the user simply releases the trigger latch 8 so that the trigger hook 7 swivels into the handle 6 due to the tensioning energy of the elastic band 3, which is then accompanied by the detachment of the elastic band 3 from the trigger hook 7, as shown in FIGS. 7 and 8. In this embodiment, the trigger latch 8 is designed in particular as a one-sided lever, whereby one side of the lever forms an actuating surface for the user's hand and the opposite side stands direct contact with the trigger hook 7.

As seen in particular from FIG. 6, the handle 6 according to the invention has a safety element 11. In the embodiment shown in FIG. 6, the safety element 11 is of ring-shaped design and is held on the handle 6 in a displaceable manner, whereby the safety element 11 overlaps the trigger catch 8 at the end in a safety position shown in FIG. 6. This prevents the trigger latch 8 from swinging out when the user releases the trigger latch 8. To end the securing, the securing element 11 is pushed off the trigger latch 8 so that the trigger latch 8 can be swiveled out again to allow the trigger hook 7 to be swiveled in.

In principle, however, the safety element 11 can also be used in connection with the embodiments shown in FIGS. 2 to 5, whereby the safety element 11 then preferably engages under the trigger latch 8 to prevent the trigger latch 8 from being pressed down.

In all embodiments, the trigger hook 7 and the trigger latch 8 preferably are arranged in a swivel-mounted manner in a receiving space of the handle 6, whereby corresponding bearing cylinders 12 are provided for this purpose, on which the trigger hook 7 and the trigger latch 8 are held in a swivel-mounted manner.

A distance 13 shown in FIG. 3 between one end of the handle 6 and the bearing cylinder 12 assigned to the trigger latch 8 is dimensioned as the width of one hand of the user. In particular, the distance 13 is between 5 and 20 cm, preferably 7 between 15 cm, and especially 8 between 12 cm.

The handle 6 preferably has an elongated and cylindrical base body 18.

The base body 18 has a threaded section 19, 20 at each end, with one threaded section 19 being a threaded pin and the other threaded section 20 being a threaded bore. In particular, the threaded section 19, which is designed as a threaded pin, is provided at the end of the base body 18 facing the spear tip 4, with the threaded section 20, which is assigned to end 5, being designed as a threaded bore.

Preferably all components forming the handle 6 are made of a metal material, preferably aluminum.

The handle 6 or the base body 18 preferably has a structured, especially grooved, circumferential surface to ensure particularly secure grip.

Finally, FIG. 9 describes a further embodiment of the fish spear 1 according to the present invention. The fish spear 1 shown here has an actuating bracket 14 connected to the elastic band 3, whereby the actuating bracket 14 is provided at the free end of the elastic band 3.

The actuating bracket 14 is designed to accommodate the user's hand to tension the band 3 along the spear rod 2 of the fish spear 1 and hook it into the trigger hook 7. For this purpose, the actuating bracket 14 is connected to the free end, preferably the free loop end, of the elastic band 3, which can be done by a further band 15. The further band 15 can be elastic or rigid, preferably rigid or in the form of a steel cable, and is passed longitudinally through the actuation bracket 14.

To connect band 3 and the further band 15, a connecting element 16, for example a snap hook, a shackle or the like, and an again further band 17 can be used. The actuating bracket 14 is defined by a straight section and two curved bow sections opposite each other on the straight section. The user can insert his hand between the bow sections in the actuating bracket 14 in order to tighten the elastic band 3 as efficiently as possible. The further band 15 is passed through the two curved bow sections and is finally hooked at the trigger hook 7 in the holding position.

REFERENCE SIGNS

1 fish spear
2 spear rod
3 elastic band
4 spear tip
5 end
6 handle
7 trigger hook
8 trigger latch
9 locking projection
10 arrow
11 safety element
12 bearing cylinder
13 distance
14 actuating bracket
15 further band
16 connecting element
17 again further band
18 base body
19 threaded section
20 threaded section

The invention claimed is:

1. A fish spear, comprising:
a handle;
a one-piece or multi-piece spear rod; and
an elastic band as a tensioning element;
wherein the spear rod comprises a spear tip at a first end of the spear rod and the elastic band is attachable to an opposite second end of the spear rod for tensioning the elastic band along the spear rod with the hand of a user;
wherein the handle is adapted to releasably secure the tensioned elastic band and comprises a trigger mechanism for manually releasing the elastic band from the handle with the user's hand;
wherein the elastic band is configured to be held in a tensioned state between one end of the elastic band at the handle and another end of the elastic band at the second end of the spear rod;
wherein triggering the trigger mechanism leads to a release of the elastic band from the handle;
wherein the trigger mechanism comprises a trigger hook for releasably hooking the elastic band to the handle and a trigger latch for moving the trigger hook to a release position, wherein movement of the trigger hook to the release position results in the elastic band being released from the trigger hook; and
wherein the trigger hook and/or the trigger latch are arranged pivotably within a receiving space of the handle.

2. A fish spear according to claim 1, wherein the band tension of the elastic band can be transferred to the user's hand when the elastic band is released from the trigger hook in order to hold the spear rod in a tensioned state of the elastic band by hand before the spear rod is fired.

3. A fish spear according to claim 1, wherein the trigger hook is formed in a holding position for holding the elastic band and wherein the transmission of a manual actuating force to the trigger latch results in the movement of the trigger hook from the holding position to the release position.

4. A fish spear according to claim 1, wherein the trigger hook is formed in a holding position for holding the elastic band and wherein the trigger hook is held in the holding position by transmitting a manual operating force to the trigger latch.

5. A fish spear according to claim 1, wherein the handle has an elongated and/or cylindrical base body.

6. A fish spear according to claim 1, wherein the handle is detachably connectable to the spear rod.

7. A fish spear according to claim 1, wherein a safety element is associated with the trigger mechanism to block the manual release of the elastic band from the handle with the user's hand as required.

\* \* \* \* \*